United States Patent
Kojima et al.

(10) Patent No.: US 9,074,932 B2
(45) Date of Patent: Jul. 7, 2015

(54) SPECTRUM DATA CORRECTION SYSTEM AND SPECTRUM DATA CORRECTION METHOD

(75) Inventors: Manabu Kojima, Musashino (JP); Gentarou Ishihara, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 766 days.

(21) Appl. No.: 12/942,621

(22) Filed: Nov. 9, 2010

(65) Prior Publication Data
US 2011/0110658 A1 May 12, 2011

(30) Foreign Application Priority Data

Nov. 10, 2009 (JP) ................................ 2009-256942
Jul. 22, 2010 (JP) ................................ 2010-164728

(51) Int. Cl.
*G01J 3/28* (2006.01)
(52) U.S. Cl.
CPC ........................................ *G01J 3/28* (2013.01)
(58) Field of Classification Search
USPC ........................................................ 398/38
See application file for complete search history.

(56) References Cited

U.S. PATENT DOCUMENTS

| | | | | |
|---|---|---|---|---|
| 5,696,707 A * | 12/1997 | Hentschel et al. | ............... | 702/69 |
| 6,226,117 B1 * | 5/2001 | Hentschel | ...................... | 359/337 |
| 6,898,001 B2 * | 5/2005 | Ishihara et al. | ............... | 359/337 |
| 6,915,076 B1 * | 7/2005 | Mittal et al. | .................... | 398/38 |
| 2002/0089665 A1 * | 7/2002 | Ishihara et al. | ............... | 356/307 |
| 2002/0113962 A1 * | 8/2002 | Kojima | ......................... | 356/307 |
| 2004/0208517 A1 * | 10/2004 | Simard et al. | ................... | 398/26 |
| 2007/0133984 A1 * | 6/2007 | Maier et al. | ..................... | 398/26 |
| 2009/0015698 A1 * | 1/2009 | Kim et al. | ..................... | 348/294 |
| 2010/0142946 A1 * | 6/2010 | Liu et al. | ........................ | 398/29 |
| 2011/0110658 A1 * | 5/2011 | Kojima et al. | .................. | 398/26 |

FOREIGN PATENT DOCUMENTS

| JP | 2002-168691 A | 6/2002 |
|---|---|---|
| JP | 2009-180679 A | 8/2009 |

OTHER PUBLICATIONS

Photodiode. (1999). In Focal Dictionary of Telecommunications, Focal Press. Retrieved from http://www.credoreference.com/entry/bhfidt/photodiode.*

(Continued)

*Primary Examiner* — David Payne
*Assistant Examiner* — Tanya Motsinger
(74) *Attorney, Agent, or Firm* — Sughrue Mion, PLLC

(57) ABSTRACT

An object of the invention is to automatically remove noise out of an input spectrum data while rounding in spectral shape is being suppressed. The spectrum data correction system wherein a noise quantity is detected on the basis of a difference in value between an extremal point of measurement data-blocks making up input spectrum data, and a mean value of measurement data-blocks in the vicinity of the extremal point, and a count of moving-average points of measurement data-blocks subjected to moving average processing is controlled according to the noise quantity, the spectrum data correction system comprises means for using an optical power, detected by a photo-detector of an optical spectrum analyzer, as the measurement data-block, thereby controlling the count of the moving-average points of the measurement data-blocks according to magnitude of a signal level of the measurement data-block.

4 Claims, 12 Drawing Sheets

(56) References Cited

OTHER PUBLICATIONS

Luo et al, "A Moving Average Filter Based Method of Performance Improvmeent for Ultraviolet Communication System" 2012, 8th IEEE, IET International Symposium on Communication System, pp. 1-4.*

* cited by examiner

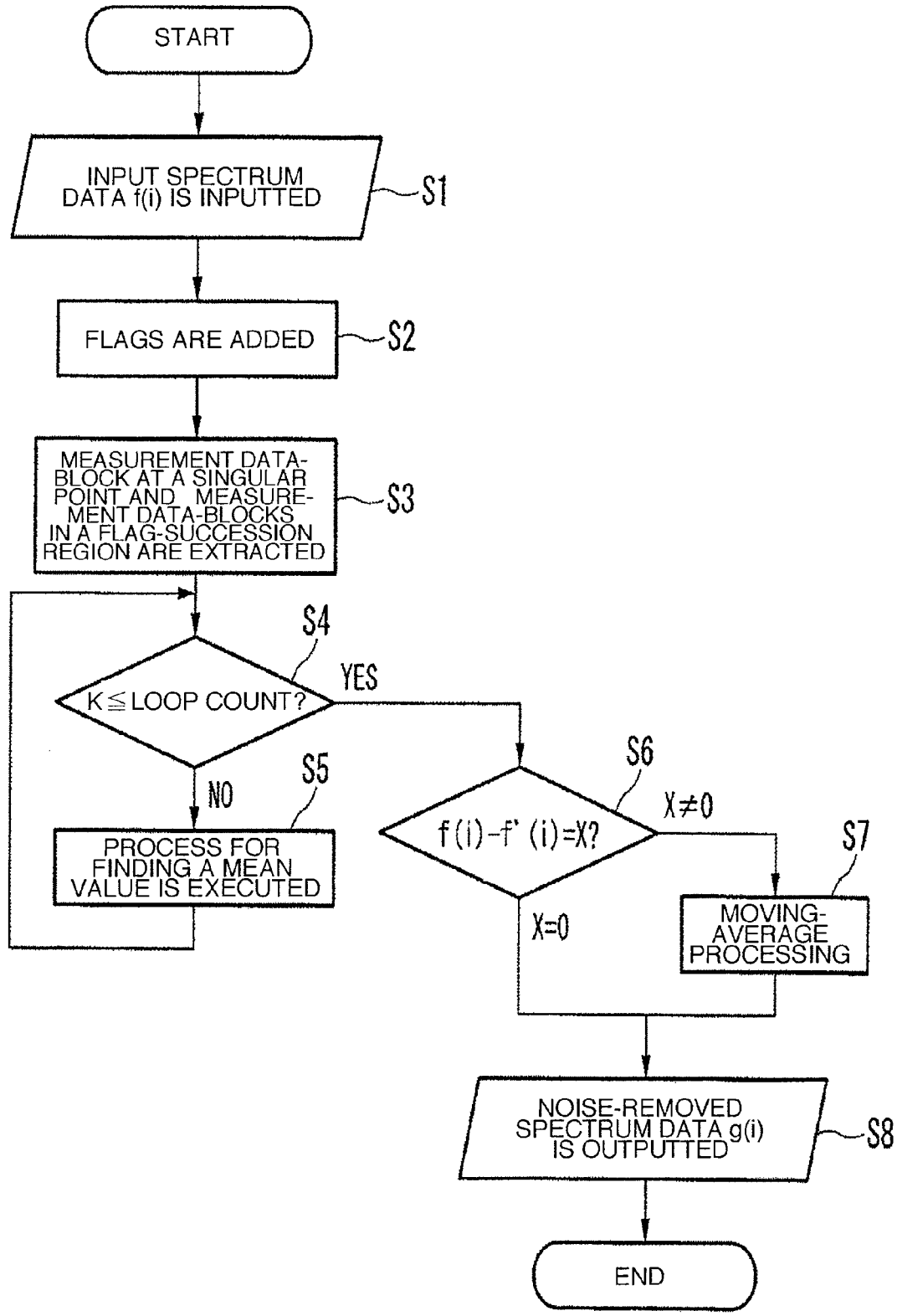

SPECTRUM DATA CORRECTION SYSTEM AND SPECTRUM DATA CORRECTION METHOD

FIELD OF THE INVENTION

The present invention relates to a spectrum data correction system for removing noise out of input spectrum data before outputting, and a spectrum data correction method.

BACKGROUND OF THE INVENTION

As noise is contained in spectrum data that is inputted (input spectrum data), processing for removing the noise contained in the input spectrum data before outputting has been executed in the past.

For example, with an optical spectrum analyzer, white noise contained in input spectrum data is removed through moving average processing before outputting (refer to Patent Document 1). According to the moving average processing, a plurality of input spectrum data acquired in time sequence are averaged, and noise components having large variation in value can cancel out each other, thereby enabling noise-removed spectrum data to be obtained.

With the conventional moving average processing, however, moving average processing is applied to all measurement data-blocks making up the input spectrum data. For this reason, even in the case of input spectrum data having a steep spectral peak, a spectral shape thereof is rounded owing to the integration effect of moving average processing that is applied in the vicinity of the steep spectral peak.

In contrast to the above, there is available a method whereby a user selects only a measurement data-block with noise superimposed thereon, and applies moving-average processing to only the measurement data-block as selected, in a localized manner, thereby preventing occurrence of rounding in spectral shape, however, in this case, human judgment will have to interfere with determination on whether or not noise is superimposed thereon, so that it is impossible to automate noise removal.

Accordingly, there have also been proposed a method for automatically removing noise out of input spectrum data while suppressing rounding in spectral shape, and a system for carrying out the method (refer to Patent Document 2).

FIG. 7 is a block diagram broadly showing a configuration of an optical spectrum analyzer 100 described in Patent Document 2. The optical spectrum analyzer 100 is mainly for use in analyzing wavelengths of a laser beam outgoing from a laser oscillator, the optical spectrum analyzer 100 being comprised of a spectroscope 1, a photo-detector 2, an amplifier 3, an A/D converter (analog/digital converter) 4, a memory 5, an operating panel 6, a CPU 7, and a display unit 8.

The spectroscope 1 converts light under test, such as, for example, a laser beam falling thereon via an optical fiber, into a dispersion spectrum to thereby extract light components contained in the light under test, having desired wavelengths, before outputting the same.

The photo-detector 2 is disposed such that a light-receiving surface thereof is opposed to the spectroscope 1 to receive light outgoing from the spectroscope 1, thereby converting the light into an electric signal to be subsequently outputted. For the photo-detector 2, use can be made of, for example, a photodiode.

The amplifier 3 is for use in amplifying the electric signal outputted from the photo-detector 2 before outputting.

The A/D converter 4 is for use in converting the electric signal (analog signal) amplified by the amplifier 3 into a digital signal, and outputting the digital signal as a measurement data-block to a buss B connected to the CPU 7.

The memory 5 is for provisionally storing various parameters besides pre-storing a control program, a signal processing program, and so forth, to be run by the CPU 7, the memory 5 being electrically connected to the CPU 7 via the buss B. The memory 5 is made up of a hard disc, a RAM (Random Access Memory), a ROM (Read Only Memory), and so forth, so as to carry out input/output of various information under instructions from the CPU 7.

The operating panel 6 is provided with various operation buttons such as function keys, ten keys, and so forth, outputting operational instructions from a user, the operating panel 6 being electrically connected to the CPU 7 via the buss B.

The CPU 7 is electrically connected to the A/D converter 4, the memory 5, the operating panel 6, and the display unit 8 via the buss B, controlling each of those units according to the control program while applying predetermined processing (a spectrum data correction method) to the measurement data-block according to the signal processing program to thereby acquire spectrum data to be displayed on the display unit 8.

The display unit 8 is for visualizing the spectrum data to be subsequently outputted, the display unit 8 being electrically connected to the CPU 7 via the buss B. The display unit 8 is made up of, for example, aN LCD (Liquid Crystal Display), or a CRT (Cathode Ray Tube).

The optical spectrum analyzer 100 acquires the spectrum data on the basis of the measurement data-blocks by the action of the CPU 7, and in this case, a spectrum data correction process (the spectrum data correction method) is executed as part of the signal-processing program according to a block diagram shown in FIG. 8.

FIG. 8 is the block diagram showing a functional configuration for execution of the spectrum data correction process by the optical spectrum analyzer 100. As shown in FIG. 8, the optical spectrum analyzer 100 is provided with a flag-addition unit 10, a selection unit 20, an execution unit 30, and an outputting unit 40 in order to execute the spectrum data correction process. In this connection, those units, namely, the flag-addition unit 10, the selection unit 20, the execution unit 30, and the outputting unit 40 are embodied by the respective actions of the memory 5, and the CPU 7.

The flag-addition unit 10 is for comparing adjacent measurement data-blocks, along a wavelength axis (a frequency axis), among the measurement data-blocks making up the input spectrum data, with each other, thereby adding a "mountain-valley flag" indicating a relationship in magnitude between the measurement data-blocks as compared to each of the measurement data-blocks as compared. Further, the flag-addition unit 10 outputs an input spectrum data-block with a flag added thereto as a flag-added spectrum data-block. Further, the input spectrum data is spectrum data that is obtained on the basis of a value of the measurement data-block inputted to the CPU 7, representing a function for expressing a value (an optical output) of the measurement data-block, per unit time, and a wavelength thereof.

More specifically, the flag-addition unit 10 compares the adjacent measurement data-blocks with each other, adding a flag "1" (valley flag) to the measurement data-block on a short-wavelength side thereof if the measurement data-block on a long-wavelength side thereof is smaller in value than the measurement data-block on the short-wavelength side, while adding a flag "0" (mountain flag) to the measurement data-block on the short-wavelength side if the measurement data-block on the long-wavelength side is equal to, or greater in value than the measurement data-block on the short-wavelength side.

Thus, in the case where the measurement data-block on the short wavelength side decreases in value, as seen from the measurement data-block on the long-wavelength side, the flag-addition unit 10 adds a flag different from a flag that is added in the case where the measurement data-block on the short-wavelength side remains unchanged, or increases in value, as seen from the measurement data-block on the long-wavelength side. Further, for convenience's sake, a flag "0" is added to a measurement data-block, on the longest wavelength side of the input spectrum data, among the measurement data-blocks making up the input spectrum data, because an object of comparison necessary for execution of flag-addition does not exist in this case.

The selection unit 20 selects a measurement data-block to which the moving average processing is to be applied, among the measurement data-blocks making up the input spectrum data, on the basis of the flag-added spectrum data-block (that is, the flag as added). Then, the selection unit 20 separately outputs a selected measurement data-block that is a measurement data-block as selected for application of the moving average processing, and an unselected measurement data-block that is a measurement data-block not selected (a measurement data-block to which the moving average processing is not to be applied).

More specifically, the selection unit 20 first compares adjacent flags with each other at the outset, and if the flags differ in marking from each other, the selection unit 20 substitutes a mean value of measurement data-blocks with respective pertinent flags added thereto for those measurement data-blocks, while if the same flag successively occurs, the selection unit 20 leave out the measurement data-blocks with the pertinent flags added thereto, respectively, as they are, thereby generating spectrum data for discriminating noise superimposition. Further, an operation for substituting the mean value of the measurement data-blocks with respective pertinent flags added thereto for those measurement data-blocks may be repeated a predetermined number of times.

Subsequently, the selection unit 20 compares the spectrum data for discriminating the noise superimposition with the input spectrum data, outputting the measurement data-block of the input spectrum data, differing in value from the measurement data-block of the spectrum data for discriminating the noise superimposition, as the selected measurement data-block, while outputting the measurement data-block of the input spectrum data, equal in value to the measurement data-block of the spectrum data for discriminating the noise superimposition, as the unselected measurement data-block.

In other words, if the adjacent flags differ in marking from each other, the selection unit 20 substitutes a mean value obtained by averaging values of the measurement data-blocks with the respective flags added thereto for the measurement data-blocks with the respective flags added thereto, to be determined as the measurement data-block of the spectrum data for discriminating the noise superimposition, thereby creating a difference from the original measurement data-block. Further, the selection unit 20 determines the measurement data-block of the input spectrum data, differing in value from the measurement data-block of the spectrum data for discriminating the noise superimposition, as the selected measurement data-block. That is, a measurement data-block having a flag different in marking from a flag added to an adjacent measurement data-block is determined as the selected measurement data-block.

FIG. 9 is a waveform chart of input spectrum data, showing the input spectrum data of a laser beam outgoing from a laser oscillator. The input spectrum data shown in FIG. 9 has a steep spectral peak P, and white noise is superimposed thereon. And since the input spectrum data of the laser beam from the laser oscillator has the steep spectral peak P, a rate of change in optical output is large in regions high in optical output, in the vicinity of the steep spectral peak P, and an effect of white noise is smaller in the regions, while the effect of white noise is larger in regions low in optical output, away from the steep spectral peak P.

If the flag-addition unit 10 adds a flag to the measurement data-blocks, respectively, against the input spectrum data, as described above, the effect of the white noise will be small in the regions high in optical output, in the vicinity of the steep spectral peak P, and a rate of change in optical output is large in each of the measurement data-blocks adjacent to each other, so that the same flag successively occurs thereto. Further, the effect of the white noise will be large in the regions low in optical output, away from the steep spectral peak P, and increase/decrease in value of the measurement data-block will occur at random, so that the flag will undergo frequent change in marking.

Further, if the adjacent flags differ in marking from each other, the selection unit 20 determines that the measurement data-blocks with the relevant flags added thereto, respectively, are the selected measurement data-block. Accordingly, the measurement data-block in the region where the effect of the white noise is large is determined as the selected measurement data-block, and the measurement data-block in the region where the effect of the white noise is small is determined as the unselected measurement data-block.

Further, since a direction of change in optical output of the respective measurement data-blocks is reversed at the steep spectral peak P, the flags differing in marking from each other are added to the respective measurement data-blocks. In consequence, if all the measurement data-blocks are each determined as the selected measurement data-block in the case of the flags differing in marking from each other, the measurement data-block at the steep spectral peak P, as well, will be determined as the selected measurement data-block to be later subjected to the moving average processing.

If input spectrum data has a steep spectral peak, in particular, the measurement data-block at the steep spectral peak P is preferably not to be subjected to the moving average processing in order to reduce deterioration in resolution and dynamic range. Accordingly, the selection unit 20 extracts the measurement data-block at the steep spectral peak P (a measurement data-block indicating the apex of input spectrum data) as the measurement data-block at the singular point, thereby determining that the measurement data-block at the singular point be not selected as the selected measurement data-block. In other words, the selection unit 20 determines the measurement data-block at the singular point as the unselected measurement data-block.

More specifically, the selection unit 20, upon comparing the adjacent flags with each other, determines that a measurement data-block at a transition point between a flag-succession region where a predetermined number of flags "1" successively occur, and a flag-succession region where a predetermined number of flags "0" successively occur is the measurement data-block at the singular point, and a value of the measurement data-block at the singular point is kept static irrespective of flag marking. By so doing, when the spectrum data for discriminating the noise superimposition is compared with the input spectrum data, the measurement data-block at the singular point will indicate the same value at both the spectrum data for discriminating the noise superimposition, and the input spectrum data, so that the measurement data-block at the singular point is determined as the unselected measurement data-block.

Further, the number of the flags, required for defining the flag-succession region, is set to the maximum number of the same flags that are estimated to successively occur in the region where the effect of the white noise is large, plus a margin for error. By so doing, the measurement data-block at the singular point can be extracted with certainty.

Further, in the case of the measurement data-blocks in the flag-succession region as well as the measurement data-block at the singular point, the effect of the white noise thereon is small, and there is therefore no need for applying the moving average processing thereto. Accordingly, with the optical spectrum analyzer 100 according to the present embodiment, the selection unit 20 determines the measurement data-blocks in the flag-succession region as the unselected measurement data-blocks as is the case with the measurement data-block at the singular point.

Now, reverting to FIG. 8, the execution unit 30 is for applying the moving average processing to the selected measurement data-block that is selected by the selection unit 20. More specifically, the execution unit 30 applies the moving average processing to the selected measurement data-block, in accordance with the following expression (1), thereby outputting a moving-average-processed measurement data-block that has been subjected to the moving average processing.

In the expression (1), g(i) indicates a value of an i-th measurement data-block of noise-removed spectrum data (spectrum data from which the last white noise is removed), f(i) a value of an i-th measurement data-block of the input spectrum data, and m a predetermined count of moving-average points, forward, and backward. Further, i of g(i) is in a range of from m+1 to n (the total number of measurement data-blocks making up the input spectrum data)−m.

Then, the execution unit 30 works out a measurement data-block in the noise-removed spectrum data, the measurement data-block being the data-block out of which the white noise has been removed according to the moving average processing:

$$g(i) = \frac{1}{2m+1} \sum_{i-m}^{i+m} f(i) \quad (1)$$

The outputting unit 40 merges the measurement data-blocks that have undergone the moving-average processing, outputted from the execution unit 30, with the unselected measurement data-blocks outputted from the selection unit 20, thereby completing noise-removed spectrum data to be subsequently outputted.

The unselected measurement data-block outputted from the selection unit 20 is represented by expression (2) after the expression (1):

$$g(i)=f(i) \quad (2)$$

FIG. 10 is a waveform chart showing the noise-removed spectrum data generated from the input spectrum data shown in FIG. 9. As is evident by comparing FIG. 10 with FIG. 9, with the noise-removed spectrum data generated by the optical spectrum analyzer 100, rounding in regions in the vicinity of the steep spectral peak P of the input spectrum data is prevented, and white noise is found removed.

Next, a spectrum data correction process (a spectrum data correction method) executed by the optical spectrum analyzer 100 made up as above is described with reference to a flow chart of FIG. 11.

When the spectrum data correction process is started, and input spectrum data f(i) is inputted (step S1), the flag-addition unit 10 compares adjacent measurement data-blocks, along the wavelength axis, among the measurement data-blocks making up the input spectrum data f(i), with each other, thereby adding a flag to the respective measurement data-blocks as compared, the flag indicating a relationship in magnitude between the respective measurement data-blocks (step S2).

At this point in time, the flag-addition unit 10 adds the flag "1" to a measurement data-block on the short-wavelength side if a measurement data-block on the long-wavelength side is smaller in value than the measurement data-block on the short-wavelength side, while adding the flag "0" to the measurement data-block on the short-wavelength side if the measurement data-block on the long-wavelength side is equal to, or larger in value than the measurement data-block on the short-wavelength side. Further, the flag-addition unit 10 outputs the input spectrum data with flags added thereto as flag-added spectrum data.

When the flags are added to the input spectrum data-block f(i) by the flag-addition unit 10, as described above, to be outputted as the flag-added spectrum data-block, the selection unit 20 compares the adjacent flags with each other, thereby extracting the measurement data-block at the singular point, contained in the input spectrum data f(i), and the measurement data-blocks in the flag-succession region (step S3), whereupon respective values of those measurement data-blocks as extracted are kept static.

Then, the selection unit 20 compares the adjacent flags with each other, executing a process (process for acquiring a mean value) whereby if the flags differ in marking from each other, the mean value of the measurement data-blocks with the pertinent flags added thereto, respectively, is substituted for those measurement data-blocks, while if the same flag successively occurs, the measurement data-blocks with the pertinent flags added thereto, respectively, are left out as they are, thereby generating spectrum data f' (i) for discriminating the noise superimposition.

More specifically, the selection unit 20 determines whether or not a count K of times that a process for finding the mean value of the measurement data-blocks is executed has reached a predetermined loop count (step S4), and if not, the selection unit 20 repeats the process until the count K of the times will reach the predetermined loop count (step S5). As a result, the spectrum data f' (i) for discriminating the noise superimposition is generated.

Subsequently, the selection unit 20 compares the input spectrum data f(i) with the spectrum data f' (i) for discriminating the noise superimposition (step S6), and if a measurement data-block at the input spectrum data f(i) is identical in value to a measurement data-block at the spectrum data f' (i) for discriminating the noise superimposition {that is, measurement data-blocks if f(i)−f' (i)=0}, the selection unit 20 determines those measurement data-blocks as unselected measurement data-blocks to be outputted as the measurement data-block of the noise-removed spectrum data g(i).

Then, the selection unit 20 determines a measurement data-block at the input spectrum data f(i), differing in value from a measurement data-block at the spectrum data f' (i) for discriminating the noise superimposition (that is, the measurement data-block of the input spectrum data, having a difference in value from the measurement data-block of the spectrum data for discriminating the noise superimposition), as the selected measurement data-block to be subsequently outputted.

Since the measurement data-block at the singular point, and the measurement data-blocks in the flag-succession region have already been extracted to be rendered static in value in the step S3, those measurement data-blocks are determined as the unselected measurement data-blocks in the step S6 to be then outputted without being subjected to the moving-average processing.

When the selected measurement data-block is outputted from the selection unit 20, the execution unit 30 applies the moving-average processing to the selected measurement data-block (step S7), thereby determining the measurement data-block with the moving average processing applied thereto (the moving-average processed measurement data-block) as the measurement data-block of the noise-removed spectrum data g(i) to be subsequently outputted.

Thus, when the unselected measurement data-block is outputted from the selection unit 20 as the measurement data-block of the noise-removed spectrum data g(i), and the execution unit 30 outputs the measurement data-block with the moving-average processing applied thereto as the measurement data-block of the noise-removed spectrum data g(i), the outputting unit 40 merges those measurement data-blocks with each other to thereby generate the noise-removed spectrum data g(i) to be subsequently outputted (step S8).

With the noise-removed spectrum data g(i) generated by the spectrum data correction process described as above, occurrence of rounding in the regions in the vicinity of the steep spectral peak P is prevented, and the white noise is found removed as shown in FIG. 10.

FIG. 12 is a flow chart for describing another spectrum data correction process executed by the optical spectrum analyzer 100. In step S6 of FIG. 12, the selection unit 20 works out the absolute value of a difference in value between a measurement data-block at the input spectrum data f(i) and a measurement data-block at the spectrum data f' (i) for discriminating the noise superimposition. Further, since the spectrum data f' (i) for discriminating the noise superimposition represents a mean value of respective values of measurement data-blocks, relationship therebetween being compared in respect of magnitude, the absolute value indicates a difference between the value of the measurement data-block of the input spectrum data f(i), and the mean value of the respective values of the measurement data-blocks, the relationship therebetween being compared in respect of magnitude.

Then, if the absolute value is 0, the selection unit 20 outputs the measurement data-blocks as the unselected measurement data-blocks. If the absolute value is not 0, the selection unit 20 outputs the measurement data-blocks as the selected measurement data-blocks, together with the absolute value.

When the selected measurement data-blocks, together with the absolute value, are outputted, the execution unit 30 undertakes to apply the moving average processing to the relevant selected measurement data-blocks, thereby varying the count m of the moving-average points, shown in the expression (1), according to the absolute value. More specifically, if the absolute value is relatively large in value, the execution unit 30 will increase the count of the moving-average points, decreasing the count of the moving-average points if the absolute value is relatively small in value.

The absolute value is proportional to a white noise quantity. For this reason, white noise can be effectively removed out of the input spectrum data f(i). Further, the moving-average processing large in the count of the moving-average points is applied to a measurement data-block large in a white-noise superimposition quantity, and white noise can be removed with greater certainty, so that continuity between the measurement data-block to which the moving-average processing has been applied, and the measurement data-block to which the moving-average processing has not been applied can be enhanced, thereby improving continuity in the noise-removed spectrum data g(i).

With the optical spectrum analyzer 100 made up as above, adjacent measurement data-blocks, along the wavelength axis, are compared with each other, and a flag indicating a relationship in magnitude between the measurement data-blocks is added thereto. Further, the measurement data-block to which the moving-average processing is to be applied is selected on the basis of a relevant flag, and the moving-average processing is applied only to the measurement data-block as selected.

In other words, on the basis of the flag indicating the relationship in magnitude between the measurement data-blocks adjacent to each other, the measurement data-block with noise superimposed thereon (where the effect of noise is large) is automatically selected, and the moving-average processing is applied only to this selected measurement data-block.

Accordingly, noise can be automatically removed out of the input spectrum data while rounding in spectral shape is being suppressed.

Further, there is adopted a configuration wherein the measurement data-block indicating the apex of the input spectrum data is extracted as the measurement data-block at the singular point before selecting the measurement data-block to which the moving-average processing is to be applied, and the measurement data-block at the singular point as extracted is not selected as the measurement data-block to which the moving-average processing is to be applied.

By so doing, the measurement data-block at the singular point can be prevented from being subjected to the moving-average processing, thereby checking deterioration in resolution and dynamic range.

RELATED ART DOCUMENTS

[Patent Document 1] JP 2002-168691 A
[Patent Document 1] JP 2009-180679 A

SUMMARY OF THE INVENTION

However, the conventional spectrum data correction method has carried a risk that a portion of spectrum, such as a spectrum peak portion thereof, where a signal level is sufficiently high, and an SN ratio is secured, is erroneously determined as the noise-superimposition point, and a noise-removal process is applied thereto. That is, there exists a possibility that the noise-removal process is applied even to a signal other than a signal as the target for the noise-removal process.

Further, in the case of spectrum in which a count of data-sampling points is small, and an abrupt change in signal level exists, there is a possibility that data discontinuity occasionally occurs at rising portions of the spectrum.

The invention has been developed in light of those problems, and it is an object of the invention not to apply a noise-removal process to a signal other than a signal as the target for the noise-removal process, and to prevent occurrence of data discontinuity in the case of a spectrum in which an abrupt change in signal level exists.

To that end, according to one aspect of the present invention, there is provided a spectrum data correction system wherein a noise quantity is detected on the basis of a difference in value between an extremal point of measurement data-blocks making up input spectrum data, and a mean value of measurement data-blocks in the vicinity of the extremal point, and a count of moving-average points of measurement data-blocks subjected to moving average processing is controlled according to the noise quantity, the spectrum data correction system comprising means for using an optical power, detected by a photo-detector of an optical spectrum analyzer, as the measurement data-block, thereby controlling the count of the moving-average points of the measurement data-blocks according to magnitude of a signal level of the measurement data-block.

The spectrum data correction system may comprise means for controlling the count of the moving-average points of the measurement data-blocks according to magnitude of a change in the input spectrum data.

Further, according to another aspect of the present invention, there is provided a spectrum data correction method comprising the steps of detecting a noise quantity on the basis of a difference in value between an extremal point of measurement data-blocks making up input spectrum data, and a mean value of measurement data-blocks in the vicinity of the extremal point, and controlling a count of moving-average points of the measurement data-blocks subjected to moving average processing according to the noise quantity, wherein the count of the moving-average points of the measurement data-blocks is controlled according to magnitude of a signal level of the measurement data-block.

The spectrum data correction method may further comprise the step of controlling the count of the moving-average points of the measurement data-blocks according to magnitude of a change in the input spectrum data.

Thus, with the present invention, it is possible to prevent execution of noise removal against a measurement data-block other than an original target for measurement. Further, improvement can be achieved with respect to data discontinuity attributable to the moving-average processing. Furthermore, noise removal even from spectrum data in wavelength ranges large in optical loss can be effected with certainty.

BRIEF DESCRIPTION OF THE DRAWINGS

FIG. 12 is a flow chart for describing another spectrum data correction process that is executed by the optical spectrum analyzer.

DETAILED DESCRIPTION OF THE PREFERRED EMBODIMENTS

Referring to the accompanying drawings, one embodiment of a spectrum data correction system according to the invention, and one embodiment of a spectrum data correction method according to the invention are described hereinafter. In the following description, an optical spectrum analyzer is cited as a system for carrying out the spectrum data correction method according to the invention (that is, a system having the function of the spectrum data correction system according to the invention), and the optical spectrum analyzer is described hereinafter.

Figure 1:
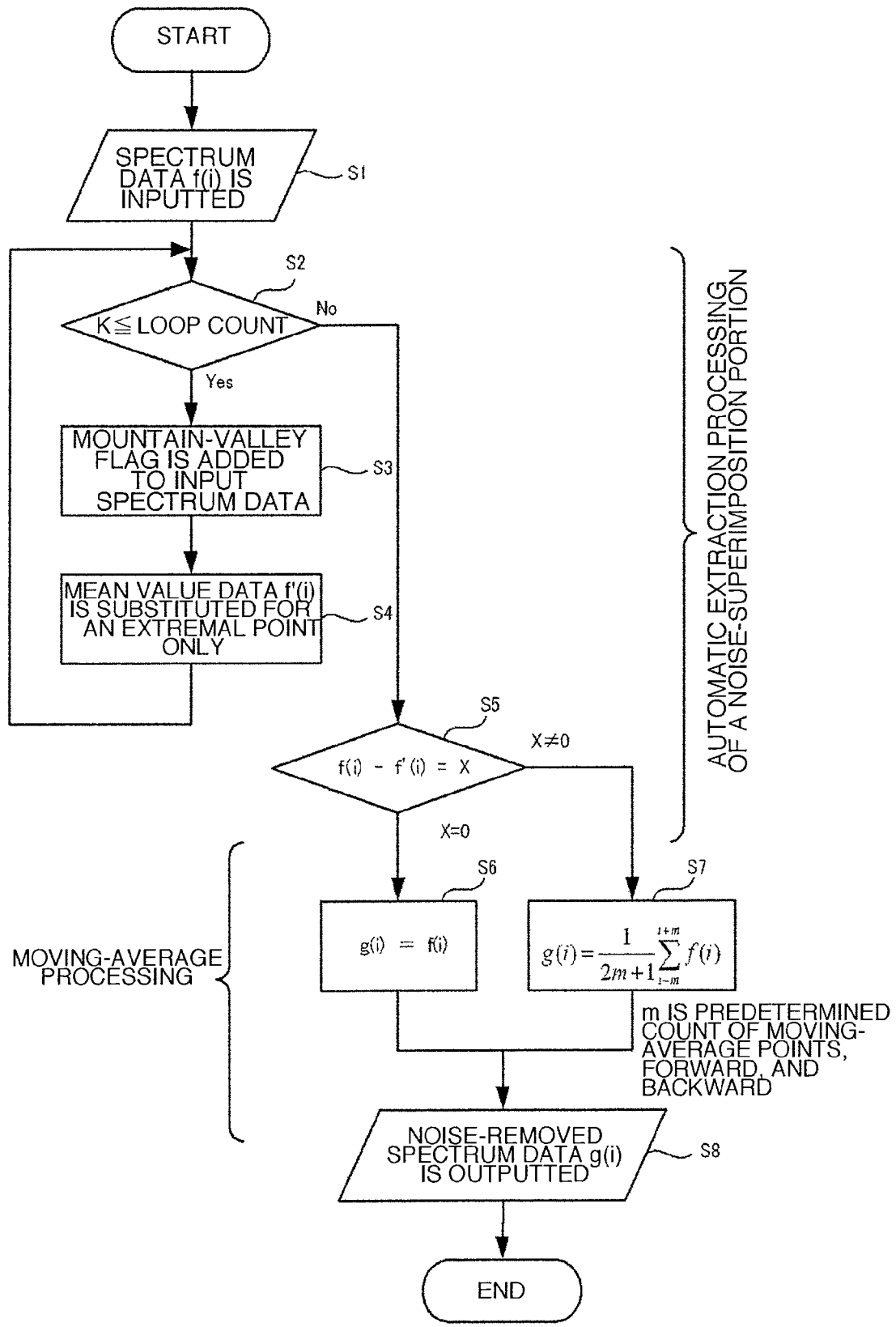
FIG. 1 is a flow chart for describing a spectrum-data correction process executed by an optical spectrum analyzer, according to the invention.

FIG. 1 is a flow chart for describing a spectrum-data correction process executed by the optical spectrum analyzer according to the invention.

In step S3 of FIG. 1, a mountain-valley flag is added to an input spectrum data f(i), and in step S4, mean value data f' (i) is substituted for an extremal point only. The mountain-valley flag is added to the mean value data f' (i) as well. By repeating this process, an effect of noise-removal can be enhanced.

In step S5, a noise quantity is detected on the basis of a difference X between a value of a measurement data-block at the input spectrum data f(i), worked out by a selection unit 20, and a value of a measurement data-block at the spectrum data f' (i) for discriminating the noise superimposition, and a count of moving-average points is controlled according to the noise quantity.

Herein, the absolute value of the difference X is proportional to a noise-superimposition quantity. That is, if the absolute value of the difference X is large, a noise quantity can be determined as large, so that the count of the moving-average points is increased, and if the absolute value of the difference X is small, the noise quantity can be determined as small, so that the count of the moving-average points is decreased.

By so doing, an effect of noise reduction can be enhanced as compared with the conventional method, and it is possible to achieve improvement with respect to data discontinuity between a point to which the moving-average processing has been applied, and a point to which the moving-average processing has not been applied.

Upon making use of the absolute value of the difference X described as above, if, for example, X1(i) derived from the following expression (3) is used instead of directly using the absolute value of X(i) for determination of the noise-superimposition quantity, this will enable an effect of noise-reduction to be further enhanced:

$$X1(i) = \frac{X(i)}{f(i)2} \quad (3)$$

According to the expression (3), a noise-superimposition quantity X1(i) as newly expressed will decrease in inverse proportion to the square of a signal level f(i). That is, given the same noise-superimposition quantity X(i), X1(i) will be smaller in value if the signal level is large, while X1(i) will be larger in value if the signal level is small. Accordingly, a count of the moving-average points is set by use of a value of X1(i).

Figure 9:
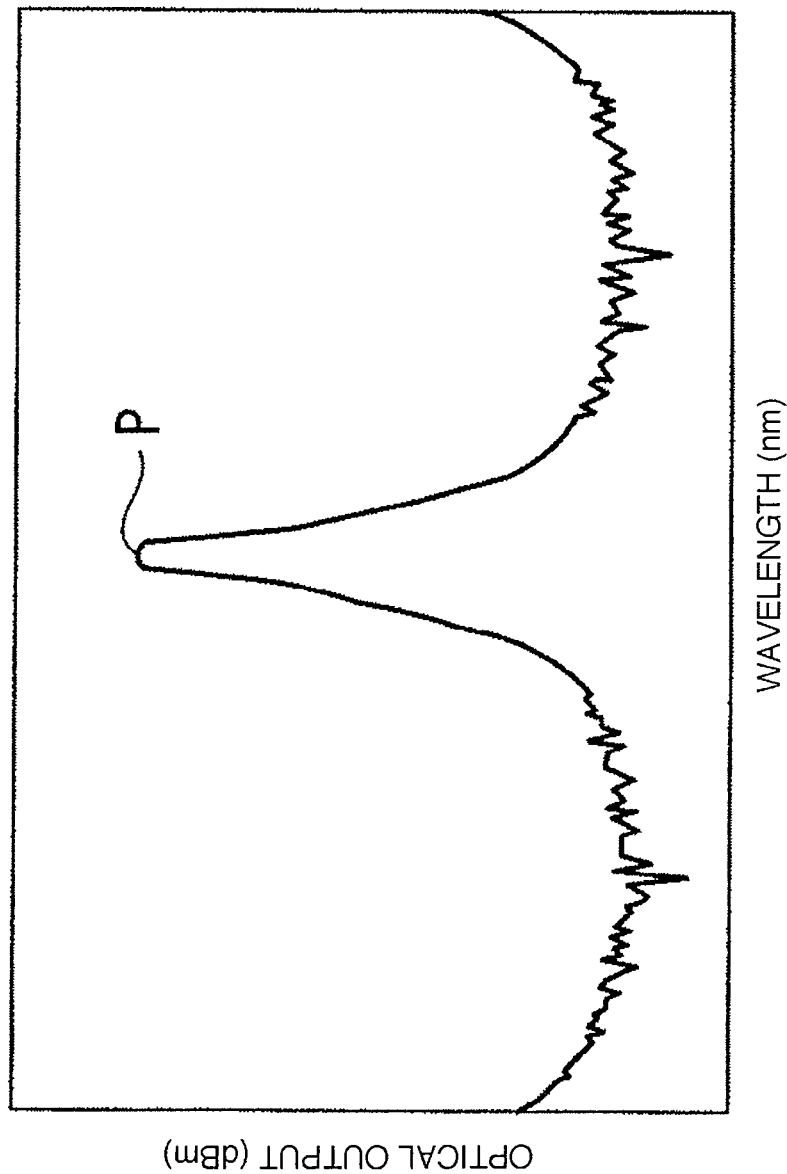
FIG. 9 is a waveform chart of input spectrum data.
Figure 10:
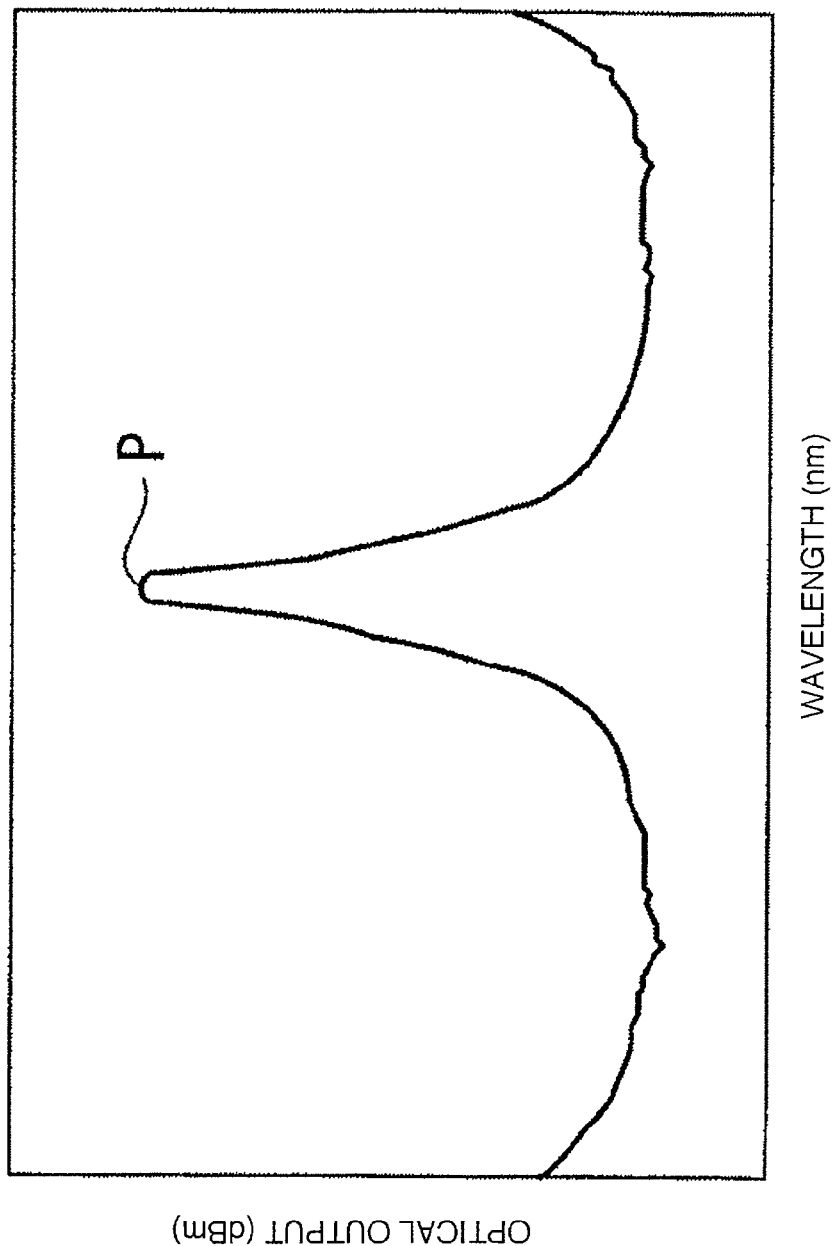
FIG. 10 is a waveform chart showing noise-removed spectrum data generated from the input spectrum data shown in FIG. 9.
Figure 11:
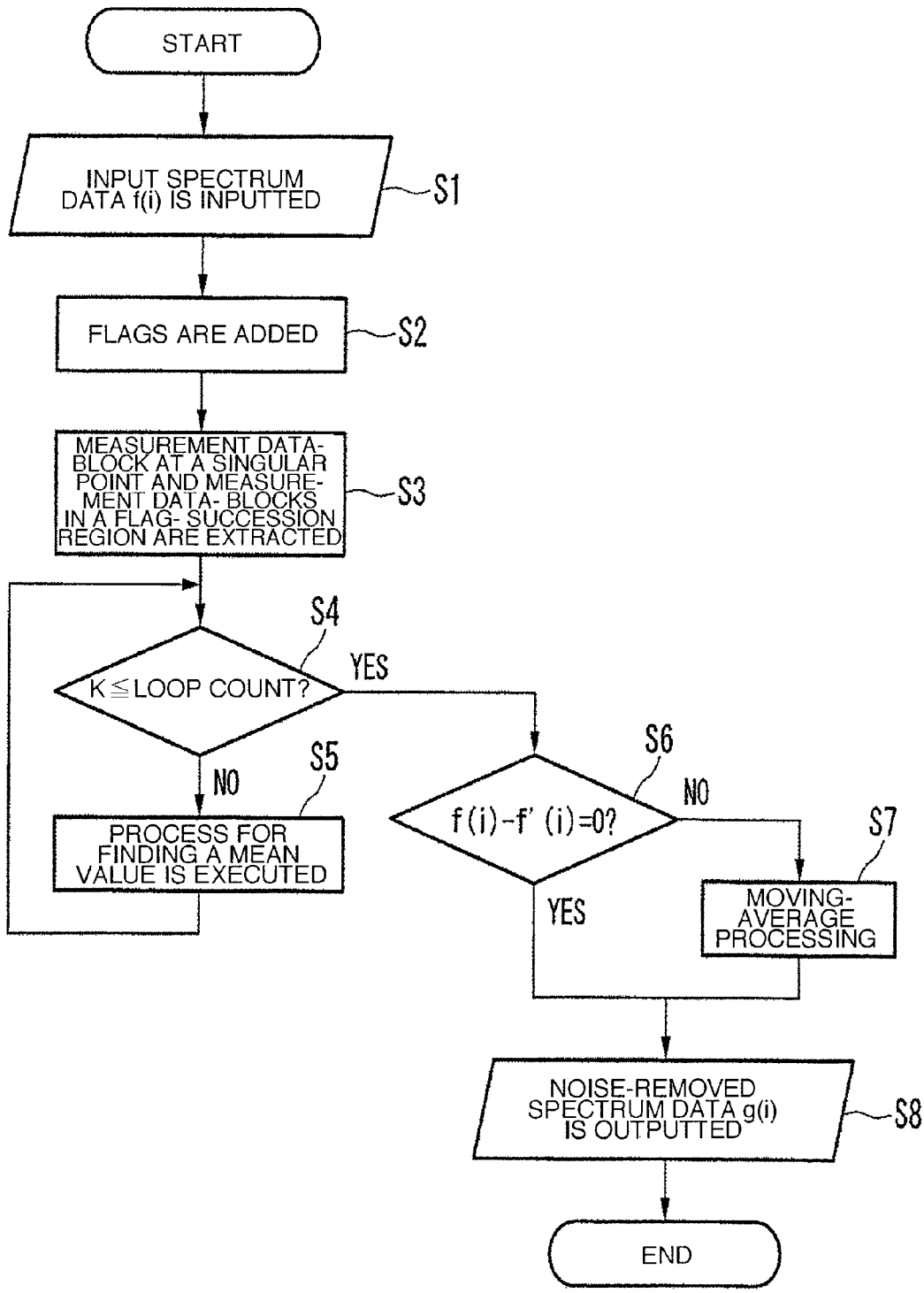
FIG. 11 is a flow chart for describing a conventional spectrum data correction process that is executed by an optical spectrum analyzer.

If the signal level is small, a sufficient SN ratio cannot be secured, and a relatively large noise is superimposed upon a spectrum, however, with the use of the method according to the present invention, noise removal can be effectively executed. For example, even at the singular point of the noise-superimposition point, shown in FIG. 9, it is possible by use of the present method to prevent erroneously determining that the signal peak is the noise-superimposition point.

In the foregoing description, it is mentioned that, upon finding X1(i), X1(i) is in such a state as to be inversely proportional to the square of the signal level f(i), however, X1(i) is not limited to the state in which it is inversely proportional to the square of the signal level f(i), as long as the noise-superimposition quantity X1(i) is in such a state as to be inversely proportional to the signal level f(i) provided that it is appropriately chosen as a function to be used.

Further, upon making use of the absolute value X as above, if X2(i) derived from the following expression (4) is used without directly using, for example, the absolute value of X(i), in order to determine the noise-superimposition quantity, it is possible to achieve improvement with respect to data discontinuity between the point to which the moving-average processing has been applied, and the point to which the moving-average processing has not been applied:

$$X2(i)=X(i)/\{\text{the max. value of several points in the front, and the back of } f(i)\}^2 \quad (4)$$

The count of the moving-average points is set on the basis of a value of X2(i) derived from the expression (4) as above, and an advantageous effect of the present method is described hereinafter by referring to an example of a specific spectrum.

Figure 2:
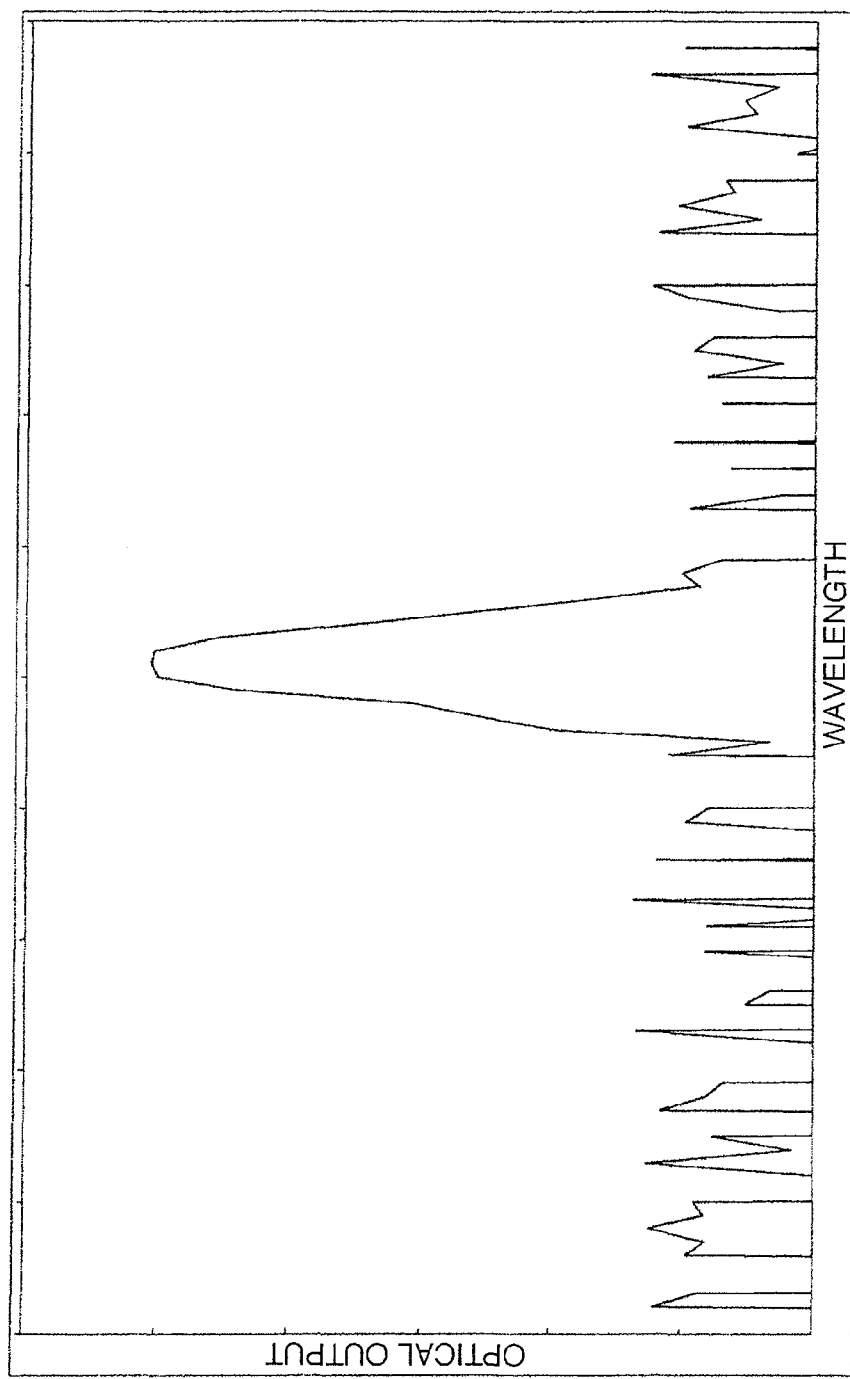
FIG. 2 shows an example of a spectrum without noise-removal applied thereto.

FIG. 2 shows an example of a spectrum without noise-removal applied thereto. This spectrum has a feature in that a count of sampling points is small, and a boundary between a portion of the spectrum, with noise superimposed thereon, and a portion thereof, without noise superimposed thereon, is extremely distinct.

Figure 3:
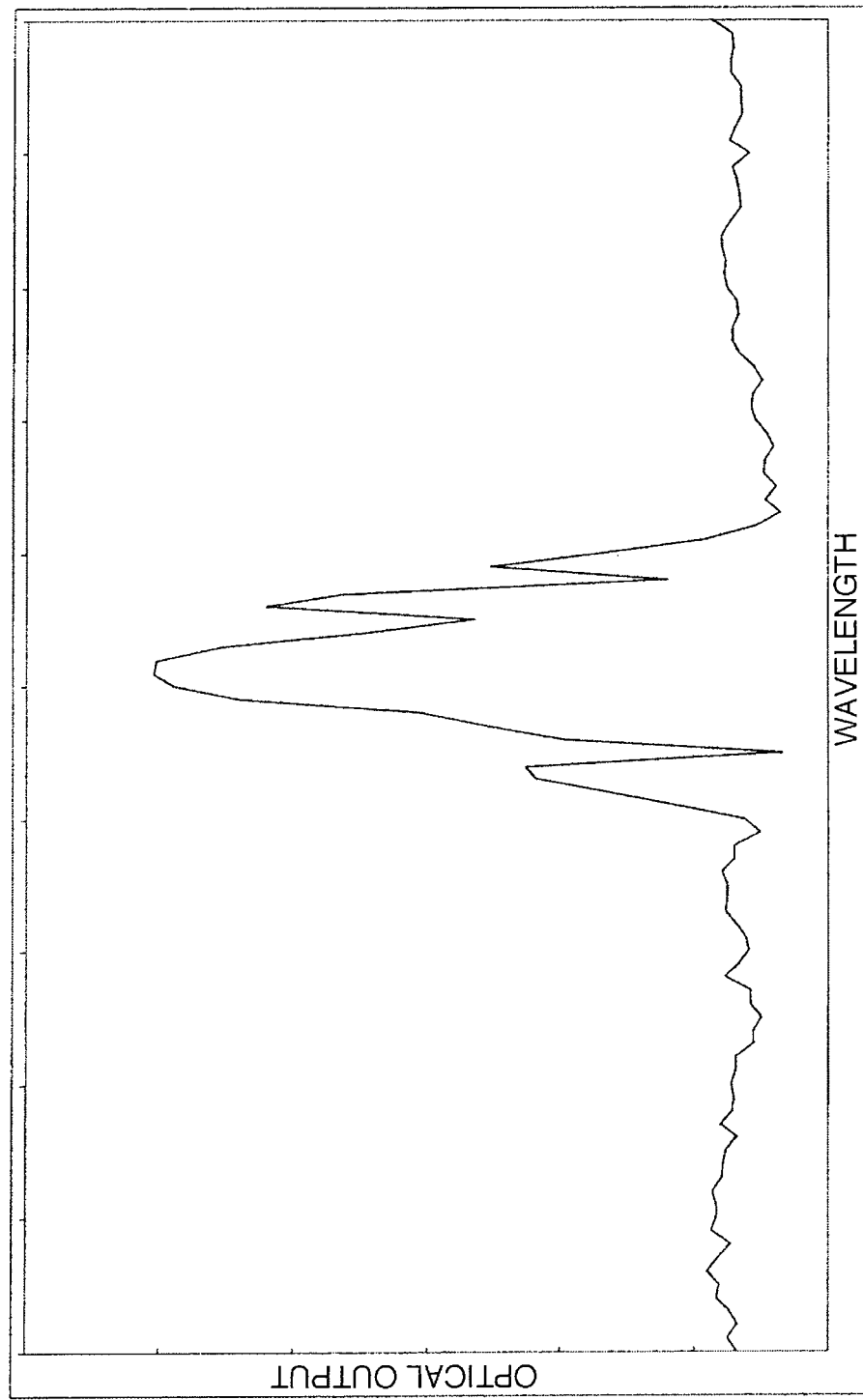
FIG. 3 shows an example of a spectrum with noise-removal applied thereto.

FIG. 3 shows an example of a spectrum obtained by setting a count of the moving-average points, based on the expression (3) as above, against the spectrum shown in FIG. 2, thereby applying noise-removal thereto. With this noise-removal method, the moving-average processing is used, so that in the case of a spectrum in which the count of data-sampling points is small, and a signal level undergoes a steep change, there can be occasions when data discontinuity, as shown in FIG. 3, occurs at rising portions of the spectrum.

Figure 4:
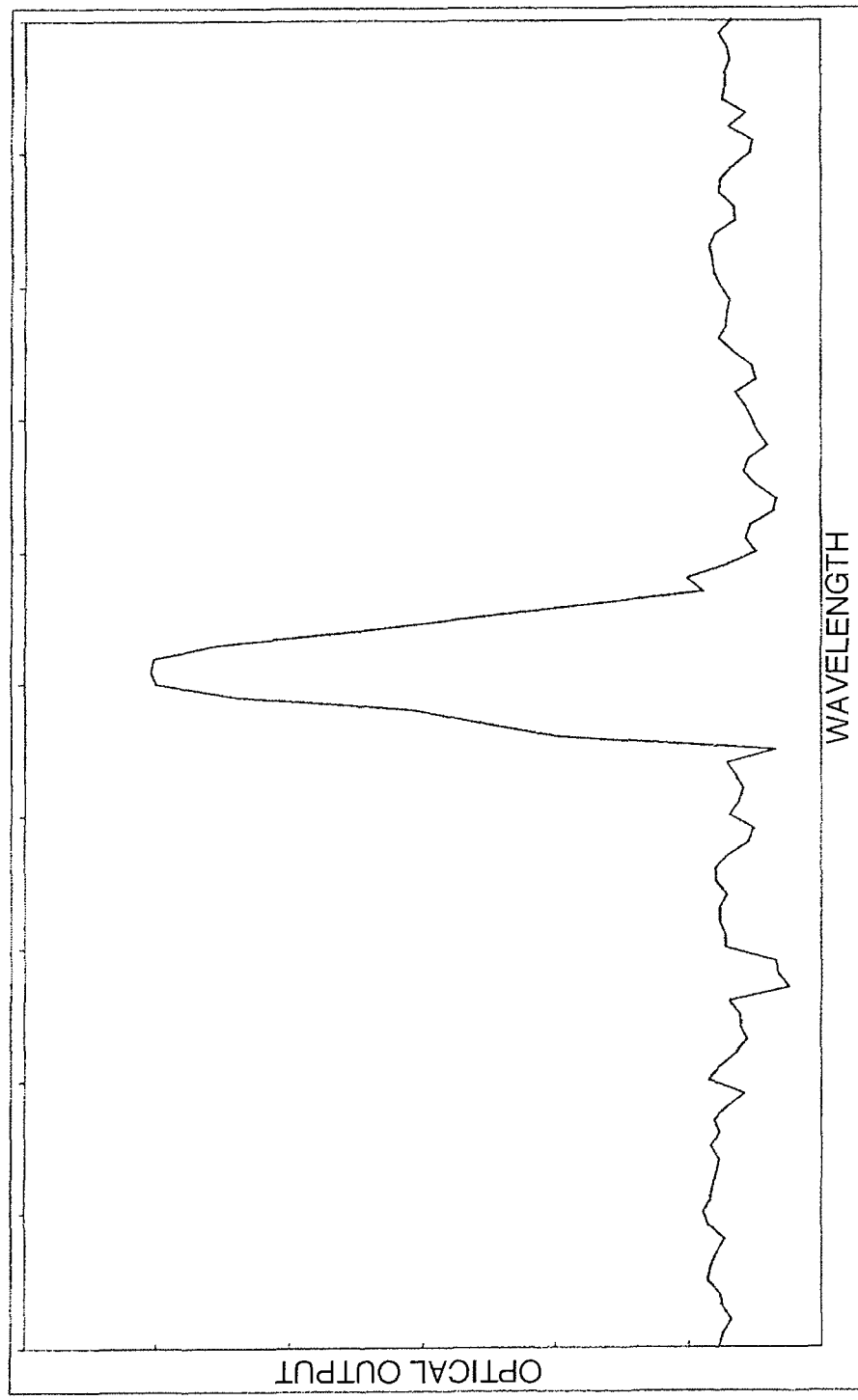
FIG. 4 shows an example of a spectrum in which improvement is achieved with respect to data discontinuity.

Accordingly, if the superimposition quantity X(i) is divided by the maximum value of several points at the front, and the back of spectrum data, using a method based on the expression (4) as above, this will enable X2(i) to be small in value as shown in FIG. 4 even at the rising portions of the spectrum, shown in FIG. 2. The same can be said of falling portions of the spectrum.

As a result, it is possible to achieve improvement with respect to discontinuity in spectrum data after noise-removal. In this connection, at the time of finding the maximum value of several points at the front, and the back of spectrum data, and upon deciding the count of the several points at the front, and the back, an appropriate value is adopted by taking into account the count of sampling points adopted at the time of measurement.

Figure 5:
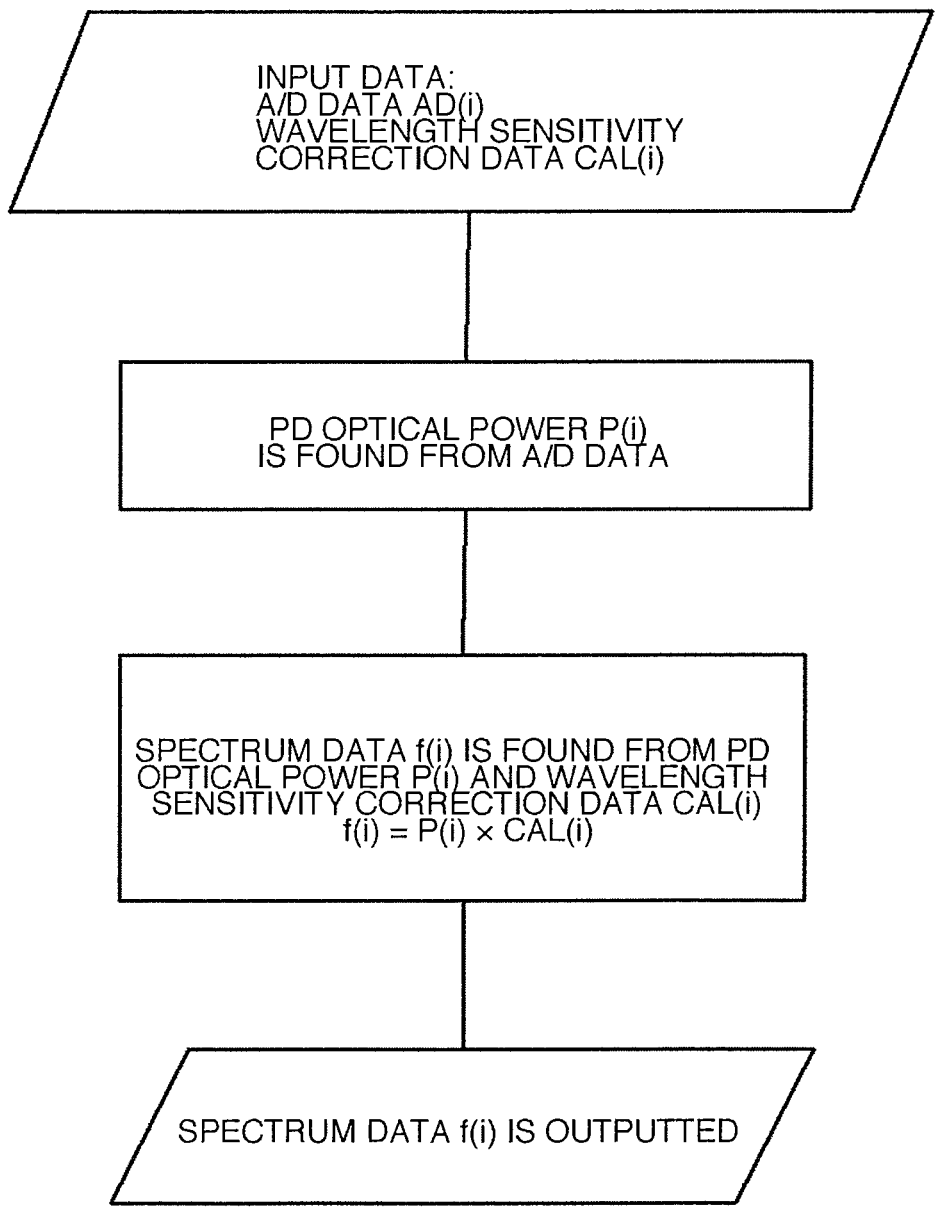
FIG. 5 is a flow chart showing a flow for working out a spectrum data-block f(i)

FIG. 5 is a flow chart showing a flow for working out spectrum data f(i). The spectrum data f(i) to be handled by an optical spectrum analyzer is data obtained by multiplying an optical power P(i), detected by the photo-detector of the optical spectrum analyzer, by wavelength sensitivity correction data CAL (i) as optical loss characteristics of an optical unit of the optical spectrum analyzer, as shown in FIG. 5.

Accordingly, in a data range (wavelength range) where an optical loss is large, and the wavelength sensitivity correction data CAL (i) is large, the spectrum data f(i) will become large in value even in the case where the optical power P(i) is low, and a noise superimposition quantity is large, resulting in a poor S/N ratio.

As a result, although the superimposition quantity X2(i) found by the expression (4) becomes small in value, and spectrum data will have a poor S/N ratio, noise-removal will not be implemented, so that noise-removal will be no longer effected against spectrum data in a wavelength range large in optical loss.

Figure 6:
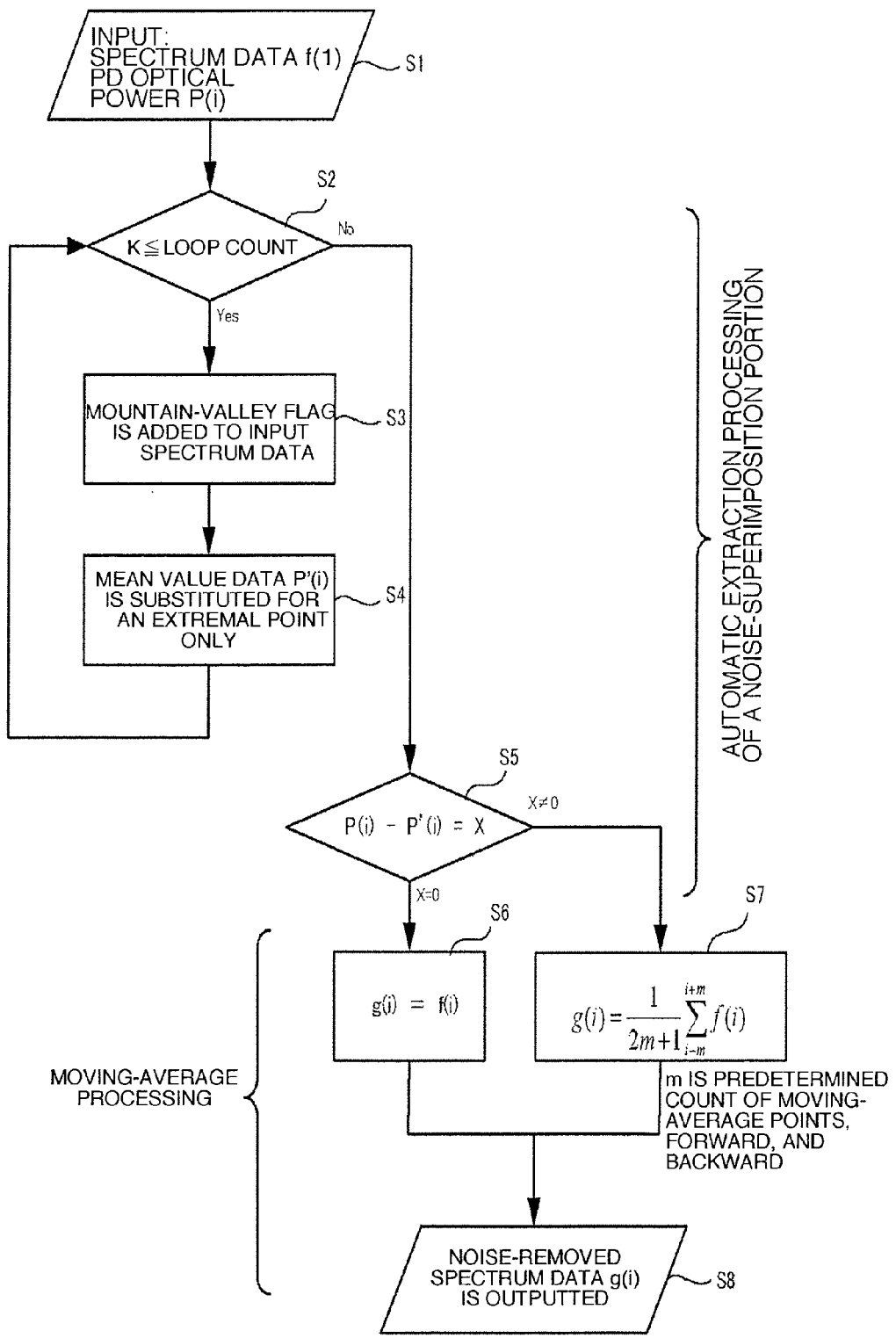
FIG. 6 is a flow chart for describing another spectrum-data correction process executed by the optical spectrum analyzer, according to the invention.
Figure 7:
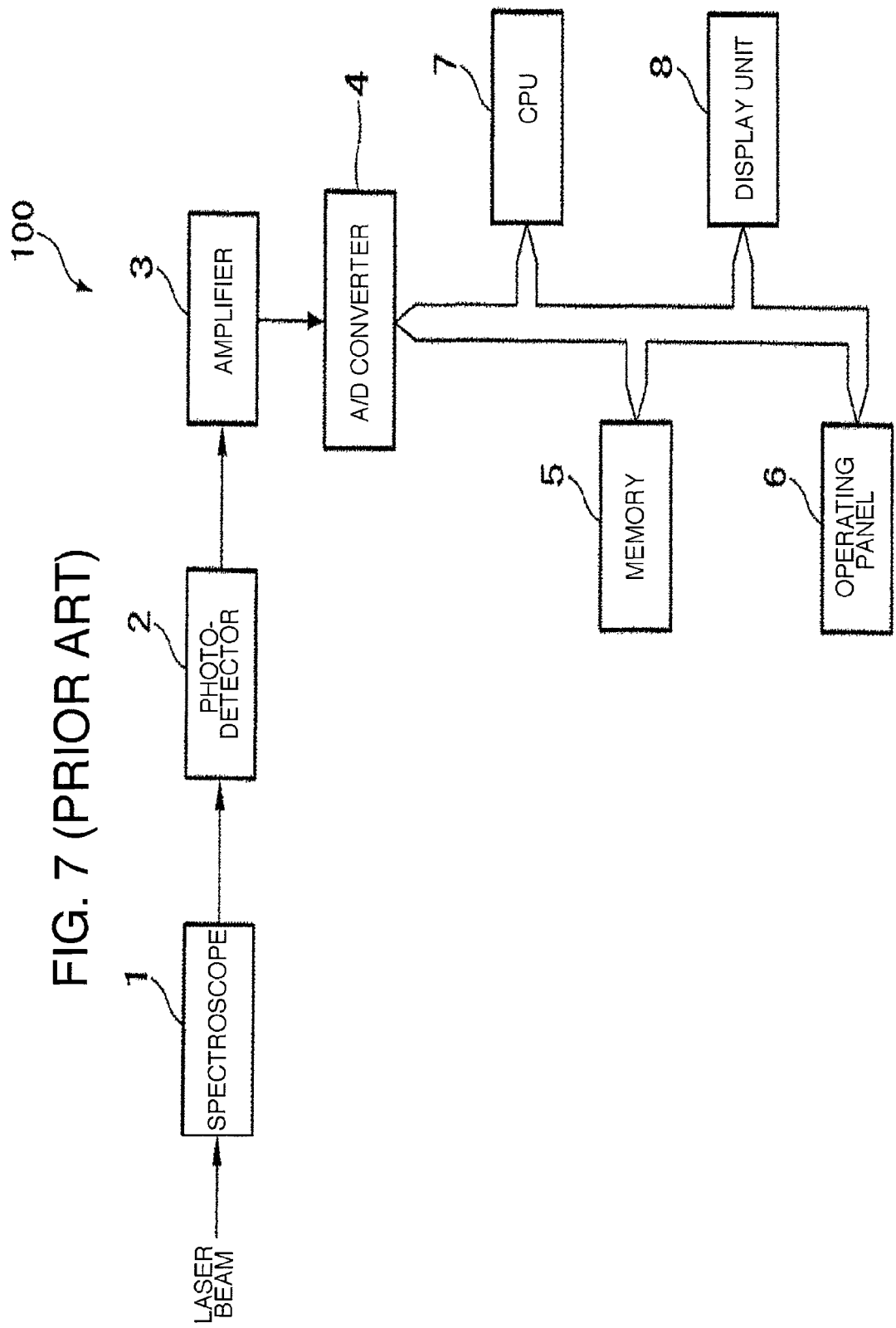
FIG. 7 is a block diagram broadly showing a configuration of a conventional optical spectrum analyzer.
Figure 8:
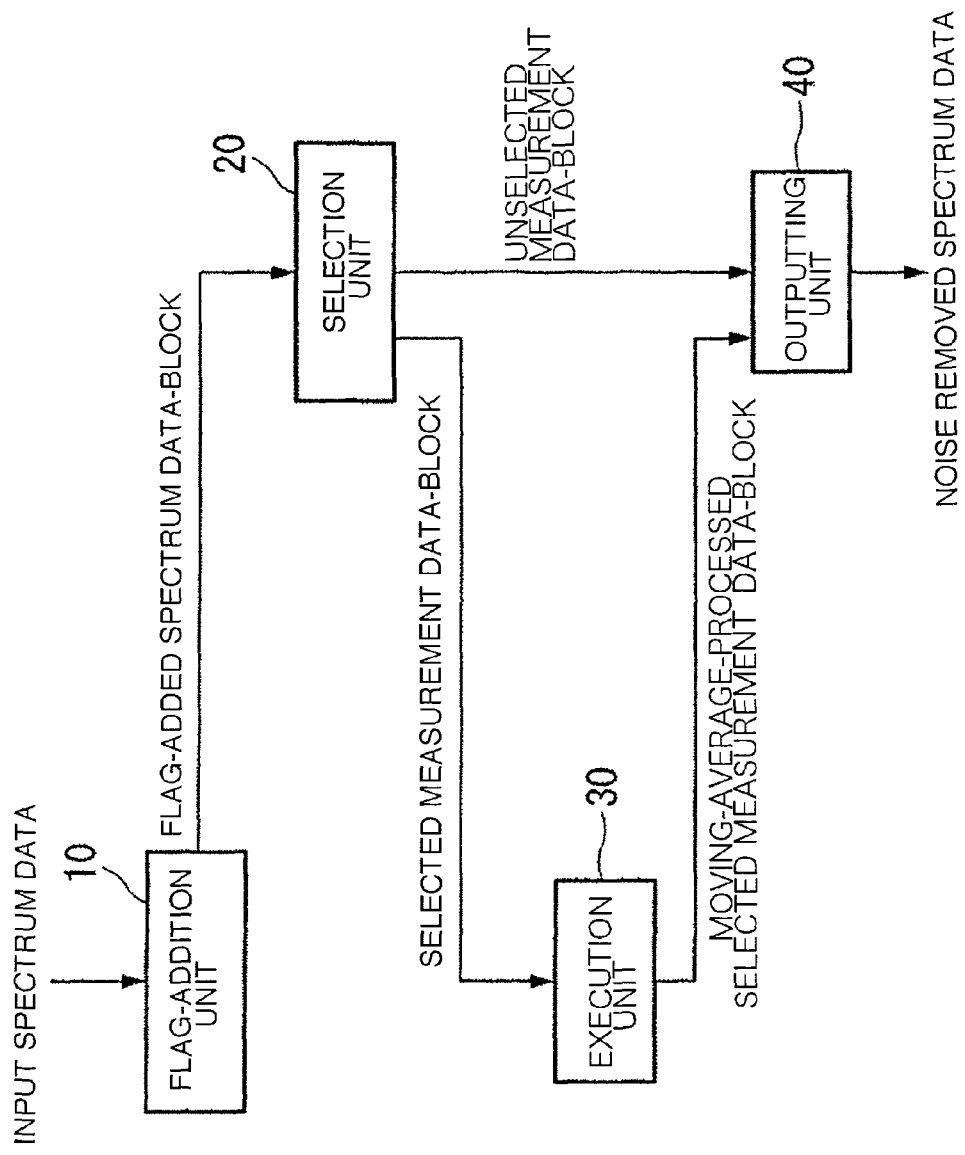
FIG. 8 is a block diagram showing a functional configuration for execution of a spectrum data correction process by an optical spectrum analyzer.

FIG. 6 is a flow chart showing a processing method for solving such a problem described as above. With the method shown in FIG. 6, automatic extraction processing of a noise-superimposition portion, in steps S1, S4, and S5, respectively, is applied to optical power P(i), detected by the photo-detector of the optical spectrum analyzer, instead of the spectrum data f(i) as shown in FIG. 1.

In the step S5, a noise quantity is detected on the basis of a difference X between an optical power P(i) at an extremal point, and a mean value P'(i) of optical powers in the vicinity of the extremal point as shown in the following expression (5):

$$X(i)=P(i)-P'(i) \quad (5)$$

Upon making use of the absolute value of the difference X, if X1(i) derived from the following expression (6) is used instead of directly using the absolute value of X(i) for determination on a noise-superimposition quantity, this will enable effects of noise-reduction to be further enhanced:

$$X1(i)=X(i)/P(i)^2 \quad (6)$$

Since the optical power P(i) detected by the photo-detector is data that is present prior to multiplication by the wavelength sensitivity correction data CAL (i), a calculated value of a noise-superimposition quantity X1(i) does not become smaller against spectrum data in a wavelength range large in optical loss (large in CAL (i)), so that noise removal can be effected with certainty.

Having described the preferred embodiments of the spectrum data correction system according to the invention, and the spectrum data correction method according to the invention, respectively, with reference to the accompanying drawings, as above, it is to be understood that the present invention be not limited thereto, and that various changes and modifications may be made in the invention on the basis of design requirements without departing from the spirit and scope of the invention because various shapes of respective constituent members, various combinations thereof, and so forth, shown in those embodiments, are for illustrative purposes only.

For example, in connection with those embodiments, there has been described a configuration wherein the measurement data-block of the input spectrum data, identical in value to the measurement data-block of the spectrum data for discriminating the noise superimposition, is determined as the unselected measurement data-block, while the measurement data-block of the input spectrum data, differing any way in value from that of the spectrum data for discriminating the noise superimposition, is determined as the selected measurement data-block. The present invention, however, is not limited thereto, and another configuration may be adopted wherein if there is a difference in value between the measurement data-block of the input spectrum data, and the measurement data-block of the spectrum data for discriminating the noise superimposition, and the absolute value of the difference is not greater than a predetermined threshold, the measurement data-blocks are determined as the unselected measurement data-blocks. If the absolute value of the difference is the predetermined threshold or greater, the measurement data-blocks are determined as the selected measurement data-blocks.

Further, with those embodiments, there has been described an example wherein the present invention is applied to an optical spectrum analyzer for use in measurement of a laser beam to acquire spectrum data using wavelengths of the laser beam as a parameter, however, the present invention is not limited thereto, and is applicable to a common spectrum analyzer for use in measurement of light other than the laser beam, and an electric signal to acquire spectrum data using not only wavelengths but also frequency as a parameter.

As described in the foregoing, with the present invention, it is possible to realize a spectrum data correction system, and method, capable of preventing execution of noise removal against a measurement data-block other than a measurement data-block as the original target for measurement, achieving improvement with respect to data discontinuity due to application of the moving-average processing, and automatically removing noise out of input spectrum data while suppressing rounding in spectral shape.

Further, since noise removal can be effected with certainty against the spectrum data even in wavelength ranges large in optical loss, the present invention is effective in enhancement in measurement sensitivity of an optical spectrum analyzer.

What is claimed is:

1. A spectrum data correction system wherein a noise quantity is detected on the basis of a difference in value between an extremal point of measurement data-blocks making up input spectrum data, and a mean value of measurement data-blocks in the extremal point and a point adjacent to the extremal point, and a count of moving-average points of measurement data-blocks subjected to moving average processing is controlled according to the noise quantity, the spectrum data correction system comprising:
    means for using an optical power, detected by a photo-detector of an optical spectrum analyzer, as the measurement data-block, thereby controlling the count of the moving-average points of the measurement data-blocks according to a quantity of noise superimposed on the measurement data-block,
    wherein the optical power is data that is present prior to multiplication by wavelength sensitivity correction data.

2. The spectrum data correction system according to claim 1, further comprising means for controlling the count of the moving-average points of the measurement data-blocks according to magnitude of a change in the input spectrum data.

3. A spectrum data correction method comprising:
    detecting a noise quantity on the basis of a difference in value between an extremal point of measurement data-blocks making up input spectrum data, and a mean value of measurement data-blocks in the extremal point and a point adjacent to the extremal point; and
    controlling a count of moving-average points of the measurement data-blocks subjected to moving average processing according to the noise quantity;
    wherein the count of the moving-average points of the measurement data-blocks is controlled, by a central processing unit, according to a quantity of noise superimposed on the measurement data-block,
    wherein the optical power is data that is present prior to multiplication by wavelength sensitivity correction data.

4. The spectrum data correction method according to claim 3 further comprising controlling the count of the moving-average points of the measurement data-blocks according to magnitude of a change in the input spectrum data.

* * * * *